(12) United States Patent
Balemarthy et al.

(10) Patent No.: US 9,329,335 B2
(45) Date of Patent: May 3, 2016

(54) BROADBAND MULTI-MODE OPTICAL FIBERS WITH FLAT-ZONE IN DOPANT CONCENTRATION PROFILE

(71) Applicant: OFS Fitel, LLC, Norcross, GA (US)

(72) Inventors: Kasyapa Balemarthy, Hyderabad (IN); Roman Shubochkin, Arlington, MA (US); Durgesh S Vaidya, Southbridge, MA (US); Man F Yan, Berkeley Heights, MA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/725,315

(22) Filed: May 29, 2015

(65) Prior Publication Data

US 2015/0253499 A1    Sep. 10, 2015

Related U.S. Application Data

(63) Continuation-in-part of application No. PCT/US2015/013655, filed on Jan. 30, 2015.

(60) Provisional application No. 62/004,376, filed on May 29, 2014, provisional application No. 61/934,223, filed on Jan. 31, 2014.

(51) Int. Cl.
*G02B 6/028* (2006.01)
*C03B 37/018* (2006.01)
*C03B 37/027* (2006.01)

(52) U.S. Cl.
CPC ............ *G02B 6/0288* (2013.01); *C03B 37/018* (2013.01); *C03B 37/01807* (2013.01); *C03B 37/027* (2013.01); *G02B 6/0281* (2013.01); *C03B 2201/12* (2013.01); *C03B 2201/28* (2013.01); *C03B 2201/31* (2013.01); *C03B 2203/22* (2013.01); *C03B 2203/223* (2013.01); *C03B 2203/26* (2013.01)

(58) Field of Classification Search
CPC .......... G02B 6/03644; G02B 6/03627; G02B 6/0281; G02B 6/0365; G02B 6/03611; G02B 6/02; G02B 6/028
USPC .......................... 385/123, 124, 125, 126, 127
See application file for complete search history.

(56) References Cited

U.S. PATENT DOCUMENTS

| | | | |
|---|---|---|---|
| 3,904,268 A | 9/1975 | Keck et al. | |
| 4,057,320 A | 11/1977 | Marcatili | |
| 4,222,631 A | 9/1980 | Olshansky | |
| 6,687,439 B1 * | 2/2004 | Endo | C03B 37/01211 385/123 |
| 7,116,877 B2 * | 10/2006 | Kuijpers | G02B 6/0288 385/123 |
| 7,315,677 B1 | 1/2008 | Li et al. | |
| 7,421,172 B2 | 9/2008 | Matthijse et al. | |
| 7,421,174 B2 | 9/2008 | Fleming, Jr. et al. | |
| 8,588,568 B2 | 11/2013 | Bookbinder et al. | |

OTHER PUBLICATIONS

D. Gloge and E.A.J. Marcatili, "Multimode Theory of Graded-Core Fibers," BSTJ, vol. 52, No. 9, 99. 1563-1578 (Nov. 1973).

(Continued)

*Primary Examiner* — Jennifer Doan
(74) *Attorney, Agent, or Firm* — Michael J. Urbane, Esq.

(57) ABSTRACT

Described is a design approach to fabricating broadband graded-index multimode fibers where the concentration profile of at least one dopant in the core region includes at least one flat-zone. Designs for use in CWDM applications are also disclosed.

16 Claims, 9 Drawing Sheets

(56) References Cited

OTHER PUBLICATIONS

E.A.J. Marcatili, "Modal Dispersion in Optical Fibers With Arbitrary Numerical Aperture and Profile Dispersion," BSTJ, vol. 56, No. 1, pp. 49-63 (Jan. 1977).

R. Olshansky, "Multiple-a Index Profiles," Applied Optics, vol. 18, No. 5, pp. 683-689 (1979).

G. Strang, Linear Algebra and Its Applications, Cengage, 4th Ed. (2006).

* cited by examiner

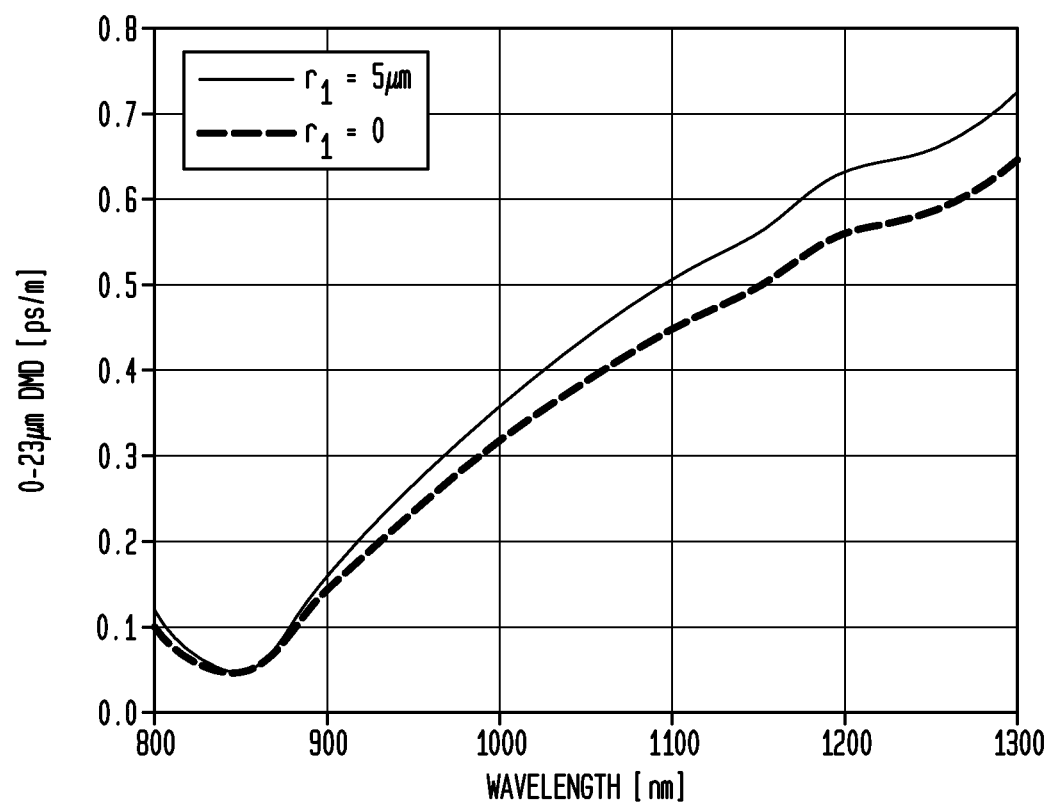

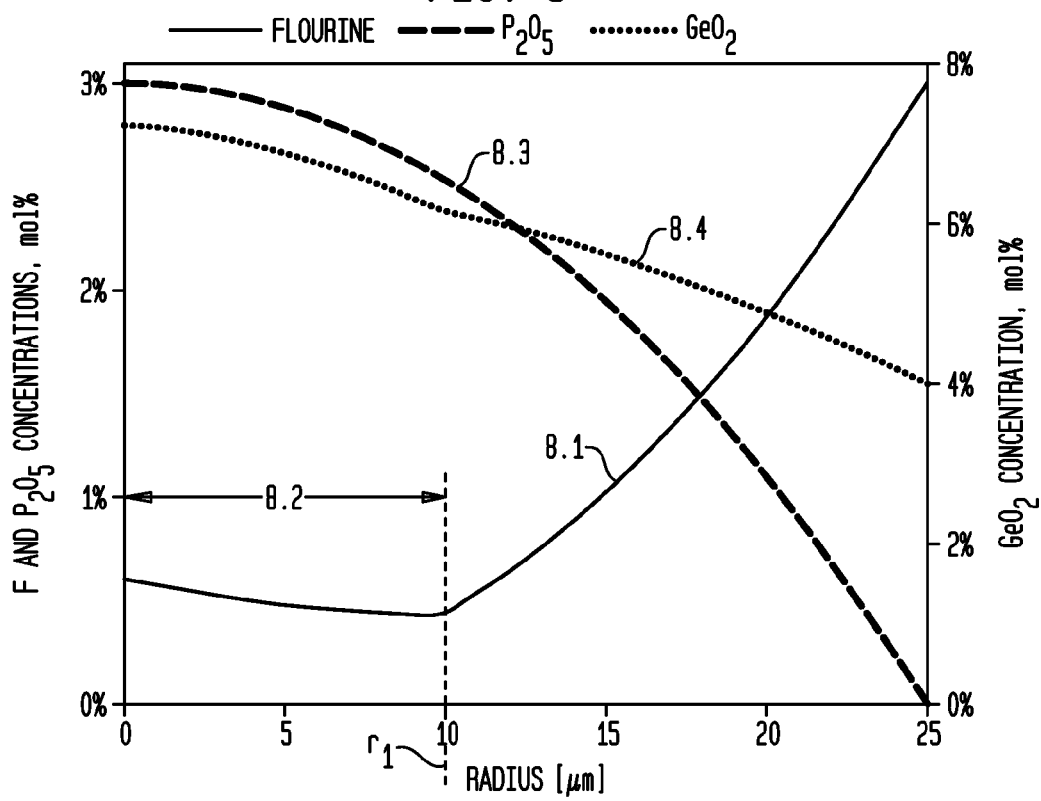
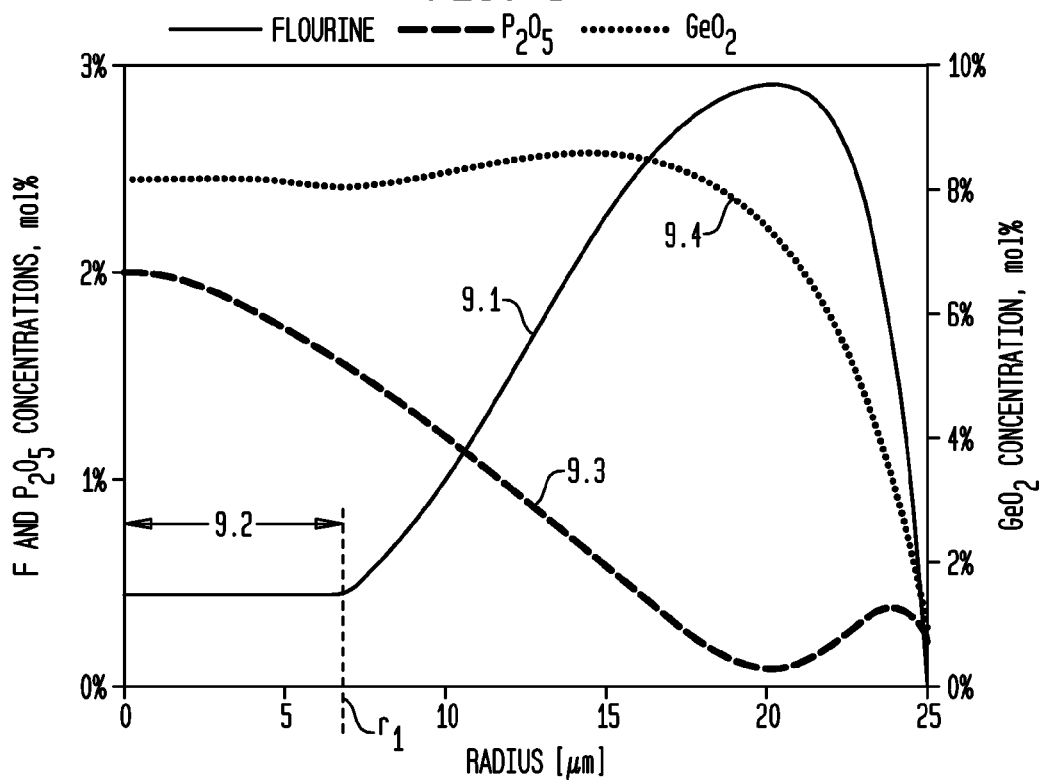

BROADBAND MULTI-MODE OPTICAL FIBERS WITH FLAT-ZONE IN DOPANT CONCENTRATION PROFILE

CROSS-REFERENCE TO RELATED APPLICATIONS

This application claims priority from provisional application Ser. No. 62/004,376 filed on May 29, 2014 and entitled "CWDM-Optimized Multimode Fiber with Flat-Bands." This application is also a continuation-in-part of copending parent application Ser. No. PCT/US15/13655 (Balemarthy et al. 1-60-16-24-1-8-65) filed on Jan. 30, 2015 and entitled "Design and Manufacture of Multi-mode Optical Fibers." Both of these applications are incorporated herein by reference.

BACKGROUND OF THE INVENTION

1. Field of the Invention

This invention relates to multimode optical fibers (MMFs) and, more particularly, to the design and manufacture of such fibers for broadband applications, including coarse wavelength division multiplexing (CWDM). Designs according to the inventive principles address specific manufacturing problems associated with particular dopants by incorporating flat-zones in the dopant concentration profile.

2. Discussion of the Related Art

A typical MMF includes a relatively high-index core region surrounded by a lower index cladding region, with the two regions configured to support the simultaneous propagation of optical radiation in the core region in a plurality of transverse modes. The base material of MMFs is typically silica glass, with the core region being up-doped with one or more dopants (e.g., Ge, Al, P) that increase its refractive index and the cladding region being either undoped or down-doped with one or more dopants (e.g., F, B) that reduce its refractive index. In some designs, dopants such as F or B may also be added to the core region as long as the net refractive index of the core region is still greater than that of the cladding region.

The choice of a specific dopant (and its concentration profile) in the core and cladding regions may be dictated by design characteristics (e.g., index grading, NA, MFD) or performance issues (e.g., bandwidth), or may dictated by manufacturing/process problems associated with the use of a particular dopant (e.g., P, F).

More specifically, Ge-dopant is commonly used to form a near-parabolic index profile in the core region of a MMF, often referred to as a graded index (GI) MMF. While the Ge-doped index profile in a GI MMF can be optimized to achieve a high bandwidth, the high material dispersion of Ge-doped silica limits the spectral width of the high bandwidth region. It is known that both P- and F-doped silica have much smaller material dispersion relative to Ge-doped silica, and fibers made with P- and/or F-dopants have much wider spectral width than conventional Ge-doped fiber [D. Gloge and E. A. J. Marcatili, "Multimode Theory of Graded-Core Fibers," BSTJ, vol. 52, no. 9, pp. 1563-1578 (November 1973), which is incorporated herein by reference]. However, it is difficult to introduce a high P-dopant concentration during preform processing because P-doped silica has a high vapor pressure, and a significant fraction of P-dopant is burned off during preform collapse. It is also difficult to maintain a circular preform core containing a high P-concentration because of its much lower viscosity than the surrounding silica substrate tube.

Furthermore, upon exposure to either hydrogen or radiation, fibers containing a high P-concentration have a significantly higher added attenuation, and the added attenuation increases monotonically with the P-dopant concentration. Therefore, it is desirable to limit the P-concentration in the fiber core region.

Fabrication of a broadband GI MMF with information transmission capacity of at least 10 Gb/s over a distance of least 300 in requires precise control of the refractive index profile of the core region. The near-parabolic index profile shape guarantees the "time of flight" propagation delay equalization (low modal dispersion) for all modes of light traveling in the core region. Any deviation from the perfect design shape will lead to a spread in travel times for different modes and will degrade the information carrying capacity of the fiber.

The refractive index profile of the core region is determined by a combined contribution from all core dopants (sometimes referred to as co-dopants). In general, in some broadband GI MMF designs it is desirable to use more than one such dopant, each with a specific concentration profile, to achieve required properties of the GI MMF, to improve glass manufacturability, or both. In any case, the resulting refractive index profile should be as close to an ideal mode-delay equalizing profile as possible and should not have any step discontinuities inside the core radius.

The preforms of GI MMFs can be fabricated from suitable gas/chemical precursors by any one of several glass deposition systems, such as MCVD, OVD, etc, each of which typically uses mass flow controllers (MFCs) to control the chemical flow rates during preform processing. Commercial MFCs have difficulty controlling flow rates accurately at low rates near or below their certified values. When MFCs are set to flow at such low rates, large and unpredictable deviations from the target rates can occur. It is particularly challenging to control F-doping at small refractive index levels. For example, the flow rate of $SiF_4$ or other F-containing precursor gases must be decreased by sixteen times when the target F-index level is reduced only two times, say from $\Delta n=-0.001$ to $\Delta n=-0.0005$, assuming all other chemical flows are kept constant. Therefore, when 10% of the full scale in the $SiF_4$ MFC is needed to obtain $\Delta n=-0.001$ index value for F, the same MFC must be set at only 0.625% (10%/16) of the MFC full scale to reach $\Delta n=-0.0005$ index for F. Such small MFC settings will result in significant flow rate errors.

While in theory it may be possible to compensate for continuous and repeatable deviations in the dopant precursor flows from their target flows, random or abrupt "step" changes in flows or full flow interruptions cannot be compensated for and will result in an imperfect core profile. As an example, one possible case when such changes may occur is when an MFC is set to control flows below its minimum certified value. It is therefore desirable to expect such process limitations and to modify fiber designs accordingly to mitigate their impact.

SUMMARY OF THE INVENTION

In accordance with one aspect of the invention, a broadband GI MMF comprises a core region of radius a configured for broadband operation at wavelengths within a predetermined wavelength range $\Lambda$, and a cladding region surrounding the core region. The core and cladding regions are configured to support the simultaneous propagation of optical radiation in the core region in a plurality of transverse modes; that is, the fiber is a multimode fiber. The core region is co-doped with a plurality of dopants, the concentrations and distribution of the dopants being radially varied within the transverse cross-section of the core region so that the refractive index of the core region is radially graded and so that variations in z(r, λ) with respect to wavelength are reduced, where, as described in co-pending parent application Balemarthy et al. 1, $$z(r,\lambda) \triangleq n^2(r,\lambda)k_0^2 \tag{1}$$

$k_0 = 2\pi/\lambda$ is the wave number, $n(r, \lambda)$ is the composite refractive index profile, and wherein the concentrations and distribution of the dopants are radially varied within the transverse cross-section of the core region so that $$\left|\frac{d[z(r,\lambda) - z_{cl}(\lambda)]}{d\lambda}\right| \leq \varepsilon_1 \text{ for } \lambda \in \Lambda \tag{2}$$

where $z_{cl}(\lambda)$ is z of the cladding region, and $\varepsilon_1$ is a tolerance factor.

In addition, to features above that reduce variations in z(r, λ) with respect to wavelength, the design of our GI MMFs also includes a "flat-zone" feature that mitigates the need for very low flow rates during fiber manufacturing and, therefore, allows fabrication of high quality, high bandwidth GI MMFs. More specifically, the concentration profile of at least one of the dopants of the core region has at least one flat-zone where the concentration of the at least one dopant is essentially constant with radius within the at least one zone.

In some embodiments of the invention, a flat-zone is located near the fiber axis, in other embodiments a flat zone is located near the interface between the core and cladding regions (i.e., near r=a), and in still other embodiments a flat zone is located between these two extremes.

In addition, in some embodiments of the invention, the core region includes multiple flat-zones; for example, one near the fiber axis extending from r=0 to r=$r_1$; and one near r=a extending from r=$r_2$ to r=a, where $r_2$<a.

Near to the fiber axis implies $r_1$<<a, whereas near to the core region radius implies $r_2$~a.

Flat-zones in accordance with our invention are realized at minimum achievable dopant levels that still enable well-controlled and continuous gas/precursor flows throughout the core region deposition phases as well as acceptable fiber performance.

In accordance with another aspect of the invention, a method of making a broadband multimode optical fiber comprises the steps of: forming a core region having a transverse cross-section and a longitudinal axis, the core region being configured for broadband operation at wavelengths λ within a predetermined wavelength range, Λ; forming a cladding region surrounding the core region; forming the core and cladding regions so that they are configured to support the propagation of optical radiation in the core region and along the axis simultaneously in a plurality of transverse modes; the core region having a refractive index profile n(r, λ); doping the core region with a plurality of dopants each having a concentration profile, the concentrations and distributions of the dopants being radially varied within the transverse cross-section of the core region so that the refractive index of the core region is radially graded and so that variations in z(r, λ) with respect to wavelength are reduced, where $$z(r,\lambda) \triangleq n^2(r,\lambda)k_0^2, \tag{1}$$

r is radius, λ is the wavelength of the optical radiation, n is the composite refractive index of the core region, $k_0 = 2\pi/\lambda$ is the wave number; the doping is performed so that the concentrations and distribution of the dopants are radially varied within the transverse cross-section of the core region and so that $$\left|\frac{d[z(r,\lambda) - z_{cl}(\lambda)]}{d\lambda}\right| \leq \varepsilon_1 \text{ for } \lambda \in \Lambda \tag{2}$$

where $z_{cl}(\lambda)$ is z of the cladding region, and $\varepsilon_1$ is a tolerance factor; and forming the concentration profile of at least one of the dopants so that it has at least one flat-zone where the concentration of the at least one dopant is essentially constant with radius within the at least one zone. The dopant concentration profiles are inputted to a deposition system that produces an optical fiber preform in which the concentration of each dopant in its core region corresponds to the inputted profiles. Using standard techniques, a fiber is drawn from the preform.

BRIEF DESCRIPTION OF THE SEVERAL VIEWS OF THE DRAWING

The invention, together with its various features and advantages, can be readily understood from the following more detailed description taken in conjunction with the accompanying drawing, in which:

FIGS. 2A-E compare the design and performance of two MMF designs at 850 nm. In both designs the core region is doped with Ge and F. In one design (solid curves) the F concentration profile has a flat-zone at r 0-5 μm, in accordance with one embodiment of the invention. The other design (dotted curves) does not have such a flat-zone;

FIG. 2A shows the Ge-dopant concentration profiles for each of the two core regions;

FIG. 2B shows the F-dopant concentration profiles for each of the two core regions. The solid profile exhibits a flat-zone at r=0-5 μm in accordance with one embodiment of the invention;

FIG. 2C shows the composite refractive index profiles for each of the two core regions;

FIG. 2D shows the effective modal bandwidth (EMBc; computed) for both MMF designs of FIGS. 2A-2C. The thresholds for OM4 and OM3 compliance are shown for reference;

FIG. 2E shows the outer differential mode delay (DMD) for both designs of FIGS. 2A-2C;

FIG. 3A shows the Ge-dopant concentration profiles for each of the two core regions;

FIG. 3B shows the F-dopant concentration profiles for each of the two core regions. The solid profile exhibits a flat-zone at r=0-5 μm in accordance with one embodiment of the invention;

FIG. 3C shows the composite refractive index profiles for each of the two core regions;

FIG. 3D shows the effective modal bandwidth (EMBc; computed) for both MMF designs of FIGS. 3A-3C. The thresholds for OM4 and OM3 compliance are shown for reference;

FIG. 4 shows the outer differential mode delay (DMD) for both designs of FIGS. 2A-2C;

FIG. 8 shows the F, P and Ge concentration profiles of a broadband MMF in accordance with an illustrative embodiment of the invention. The F concentration profile 8.1 exhibits a flat-zone 8.2 near the fiber axis; and FIG. 9 shows the F, P and Ge concentration profiles of a broadband MMF in accordance with another illustrative embodiment of the invention. The F concentration profile 9.1 exhibits a flat-zone 9.2 near the fiber axis.

Figure 1A:
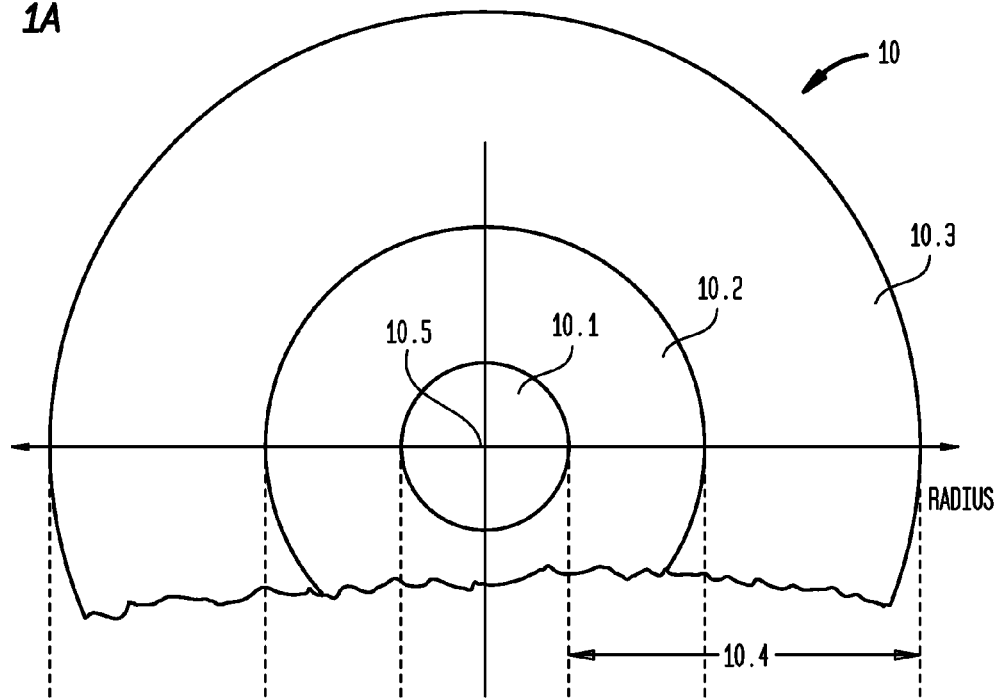
FIG. 1A is a partially cut-away view of a schematic, transverse cross-section of a MMF in accordance with an illustrative embodiment of the invention.

Various ones of the foregoing figures are shown schematically in that they are not drawn to scale and/or, in the interests of simplicity and clarity of illustration, do not include all of the details of an actual optical fiber or product depicted. Many of the figures contain a designation $r_1=0$ μm, which means that the corresponding dopant concentration profile has no flat-zone near the fiber axis. (In actuality, the dopants with an $r_1=0$ μm designation are depicted as having no flat-zone anywhere in their concentration profiles, although in practice a flat-zone elsewhere in the profile is not excluded.)

GLOSSARY

Broadband: The term bandwidth refers to the wavelength range Λ over which a fiber, device, apparatus or system is intended to operate. The term broadband refers to a bandwidth that is relatively large (wide), depending on the intended application. For example, silica glass MMFs are considered to be broadband fibers if they are designed to operate over a wavelength range of 780 nm-1550 nm in some applications, or over a range of 780 nm-1300 nm in other applications. The term broadband is used herein interchangeably and synonymously with the term wideband.

Center Wavelength: Throughout this discussion references made to wavelength are intended to mean the center wavelength of a particular light emission, it being understood that all such emissions have a characteristic linewidth that includes a well-known range of wavelengths above and below the center wavelength.

Constant or Flat Concentration: By the phrases essentially constant or essentially flat (dopant concentration) we mean the magnitude of the concentration does not vary by more than approximately ±0.1 mole % within the zone when the concentration level of the dopant is less than approximately 1.0 mole %.

Down-doped Cladding: The phrases down-doped cladding region, or simply down-doped MMF, means the refractive index of the entire cladding region (both the inner and outer cladding regions) is below that of pure silica.

Glass Fiber: Optical fiber of the type described herein is typically made of glass silica) in which the refractive indices of the core region and of the cladding region are controlled by the amount and type of one or more dopants (e.g., P, Al, Ge, F, Cl) or by hollow voids incorporated therein during the fabrication of the fiber, as is well known in the art. These refractive indices, as well as the thicknesses/diameters of core/cladding regions, determine important operating parameters, as is well known in the art.

Index: The terms index and indices shall mean refractive index and refractive indices. In designs where a particular region (e.g., a cladding region) includes microstructure [e.g., holes, whether filled (e.g., with a low-index gas, liquid or solid) or unfilled (e.g., air-holes)], then the index of such a region is intended to mean the average index seen by light propagating in that region.

Index Profile: The schematic index profiles e.g. FIGS. 1B, 1C, 2C, 3C) depict averages of the actual minute variations of index that would be observable in an optical fiber. In addition, although various regions of the index profile may be shown as being rectangular, the boundaries of such regions need not be horizontal or vertical; one or more may be slanted, for example, the region may be trapezoidal or triangular. The term composite index profile of a region (e.g., core) results from the combination of the dopant concentration profiles of dopants within that region.

Mode: The term mode(s) shall mean the transverse mode(s) of an electromagnetic wave (e.g., signal light, which includes signal light to be amplified in the case of an optical amplifier or the stimulated emission in the case of a laser).

Multimode: The term multimode means the fiber is capable of supporting the propagation of more than one mode simultaneously. Many-moded fibers, as well as few-moded fibers, are both embraced within the scope of the invention.

Radius/Diameter: Although the use of the terms radius and diameter in the foregoing (and following) discussion implies that the transverse cross-sections of the various regions (e.g., core, trench, Cladding) are circular and/or annular, in practice these regions may be non-circular; for example, they may be rectangular, elliptical, polygonal, irregular or other more complex shapes. Nevertheless, as is common in the art, we frequently use the terms radius and/or diameter for simplicity and clarity.

Signal Propagation: Although signal light may actually crisscross the longitudinal axis of the fiber as it propagates along a fiber, it is well understood in the art that the general direction of propagation is fairly stated as being along that axis (e.g., axis 10.5 of FIG. 1A).

Transverse Cross-Section: The phrase transverse cross-section means a cross-section of fiber in a plane perpendicular to the longitudinal axis of the fiber.

Undoped: The term undoped or unintentionally doped means that a region of a fiber, or a starting tube used to form such a region, may contain a dopant not intentionally added to or controlled in the region during fabrication, but the term does not exclude low levels of background doping that may be inherently incorporated during the fabrication process. The term pure silica means that a silica body (e.g., an outer cladding) is undoped.

DETAILED DESCRIPTION OF THE INVENTION

General Fiber Structure

Figure 1B:
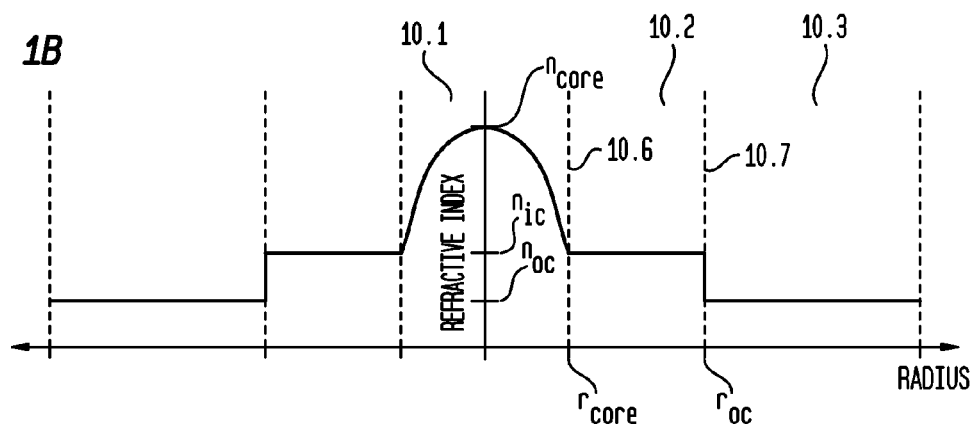
FIG. 1B shows an illustrative refractive index profile of another embodiment of the MMF of FIG. 1A along a diameter of the fiber.
Figure 1C:
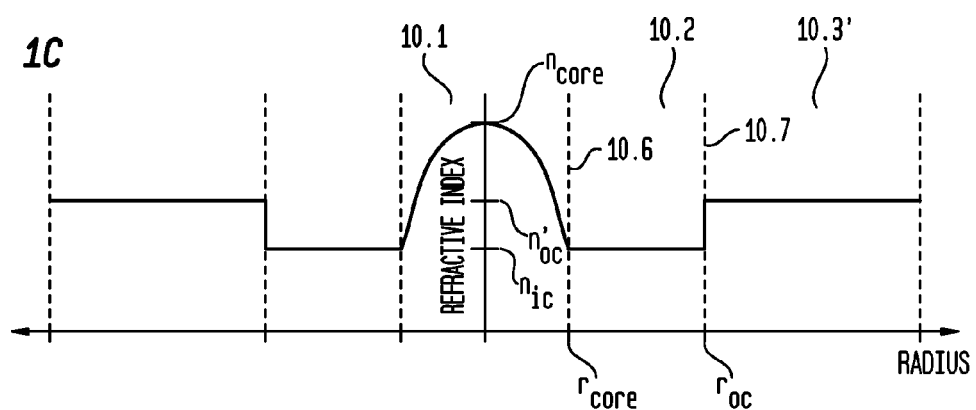
FIG. 1C shows another illustrative refractive index profile of one more embodiment of the MMF of FIG. 1A along a diameter of the fiber.

In accordance with some embodiments of the invention, as shown in FIGS. 1A, 1B, & 1C, a multimode, silica optical fiber 10 comprises a relatively high index ($n_{core}$) silicate core region 10.1 surrounded by an annular, lower index cladding region 10.4. The cladding region 10.4 includes an outer cladding region 10.3 (index $n_{oc}$) surrounding an inner cladding region 10.2 (index $n_{ic}$), which in turn surrounds the core region 10.1. Thus, the inner cladding region 10.2 extends from the outer edge 10.6 (at $r=r_{core}$; often labeled $r=a$) of the core region 10.1 to the inner edge 10.7 (at $r=r_{oc}$) of the outer cladding region 10.3. Depending on the design, the outer cladding region 10.3 may have a refractive index that is below that of the inner cladding region 10.2; that is, $n_{oc}<n_{ic}$ (FIG. 1B), or above that of the inner cladding region 10.2; that is, $n_{oc}'>n_{ic}$ (FIG. 1C), or substantially equal to that of the inner cladding region 10.2; that is, $n_{oc} \sim n_{oc}$ (not shown).

In addition, the refractive index of the core region 10.1 is graded from a maximum ($n_{core}$) at or near its center (longitudinal axis 10.5) to a minimum ($n_{ic}$) at its interface 10.6 with the inner cladding region 10.2. Typically the grading profile is approximately parabolic.

In accordance with some embodiments of the invention, the core region 10.1 comprises silica co-doped with suitable amounts of one or more of the following dopants: P (e.g., a phosphorous oxide such as $P_2O_5$), Ge (e.g., a germanium oxide such as $GeO_2$), Al (e.g., an aluminum oxide such as $Al_2O_3$) and F. In general, $P_2O_5$, $GeO_2$ and $Al_2O_3$ are used to increase the refractive index of silica, whereas F is used to decrease it. Importantly, however, the specific compositions of the co-dopants and their distribution within the core region are determined by application of equations (2) and (3), as described below, to produce a broadband MMF having an NA of approximately 0.2 and a bandwidth of approximately 780-1550 nm.

Designing Broadband GI MMFs

The following exposition describes a design approach in accordance with illustrative embodiments of the invention that is applicable to GI MMFs for use in broadband (e.g., CWDM) systems. It will be apparent to those skilled in the art, however, that the same approach may be readily applied to the design of MMFs for use in other applications.

Copending parent application Serial No. PCT/US15/13655 (Balemarthy et al. 1-60-16-24-1-8-65) describes a general framework based on the light propagation equations, which is a fundamental departure from the prior art approach to broadband MMF design. In accordance with one aspect of Balemarthy et al. 1, which is incorporated herein by reference, a broadband optical fiber comprises a core region configured for broadband operation at wavelengths within a predetermined wavelength range $\Lambda$, and a cladding region surrounding the core region. The core and cladding regions are configured to support the simultaneous propagation of optical radiation in the core region in a plurality of transverse modes; that is, the fiber is a multimode fiber (MMF). The core region is co-doped with a plurality of dopants, the concentrations and distribution of the dopants being radially varied within the transverse cross-section of the core region so that the refractive index of the core region is radially graded and so that variations in $z(r, \lambda)$ with respect to wavelength are reduced (preferably minimized), where $$z(r,\lambda) \triangleq n^2(r,\lambda)k_0^2, \quad (1)$$

$k_0 = 2\pi/\lambda$ is the wave number, $n(r,\lambda)$ is the refractive index profile, and wherein the concentrations and distribution of the dopants are radially varied within the transverse cross-section of the core region so that $$\left| \frac{d[z(r,\lambda) - z_{cl}(\lambda)]}{d\lambda} \right| \leq \varepsilon_1 \text{ for } \lambda \in \Lambda \quad (2)$$

where $z_{cl}(\lambda)$ is z of the cladding region, and $\varepsilon_1$ is a tolerance factor.

In addition to features above that reduce variations in $z(r,\lambda)$ with respect to wavelength, which assist in optimization of the fiber, the design of our GI MMFs also includes a "flat-zone" feature that mitigates the need for using very low flow rates during fiber manufacturing and, therefore, allows fabrication of high quality, high bandwidth GI MMFs. More specifically, in accordance with the invention, the concentration profile of at least one of the dopants of the core region has at least one flat-zone where the concentration of the at least one dopant is essentially constant with radius within the at least one zone.

In one embodiment of the invention, the core region may include one or more flat-zones; for example, one near the fiber axis extending from $r=0$ to $r=r_1$; and one near $r=a$ between extending from $r=r_2$ to $r=a$, where $r_2<a$.

Flat-zones in accordance with our invention are realized at minimum achievable dopant levels that still enable well-controlled and continuous gas/precursor flows throughout the core region deposition phases as well as acceptable fiber performance.

Example I

Figure 5:
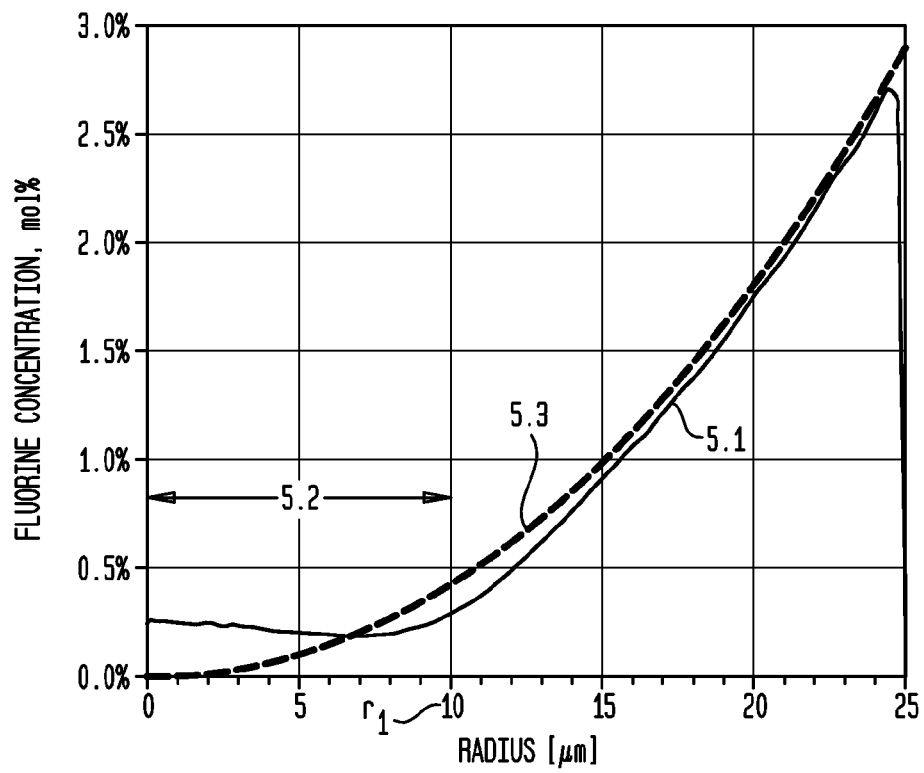
FIG. 5 shows two F-dopant concentration profiles. One profile (solid curve) stays relatively flat as it heads toward r=0 and exhibits a flat-zone at r 0-10 μm, in accordance with yet another embodiment of the invention. The other profile (dotted) does not exhibit such a flat-zone.

In one illustrative embodiment of the invention, the core region (radius $r=25$ μm) of a GI MMF includes F as one of its dopants, as shown in FIG. 5. In general the dopant concentration profiles of the core region are designed following the principles of equations (1) and (2). In addition, the F concentration profile, shown by curve 5.1, exhibits a single flat-zone 5.2 extending from $r=0$ to approximately $r_1=10$ μm. The flatness of the zone is illustrated by the relatively small changes in the F concentration, which varies from approximately 0.3 mole % at $r=0$, to as low as approximately 0.2 mole % at $r=8$ μm, to as high as 0.3 mole % at $r=10$ μm. Thus, the F concentration within zone 5.2 can be described as being relatively flat and characterized by a F concentration of approximately 0.25 mole %±0.05 mole %.

For comparison, we include a F concentration profile 5.3, which has no flat-zones.

Example II

Figure 6:
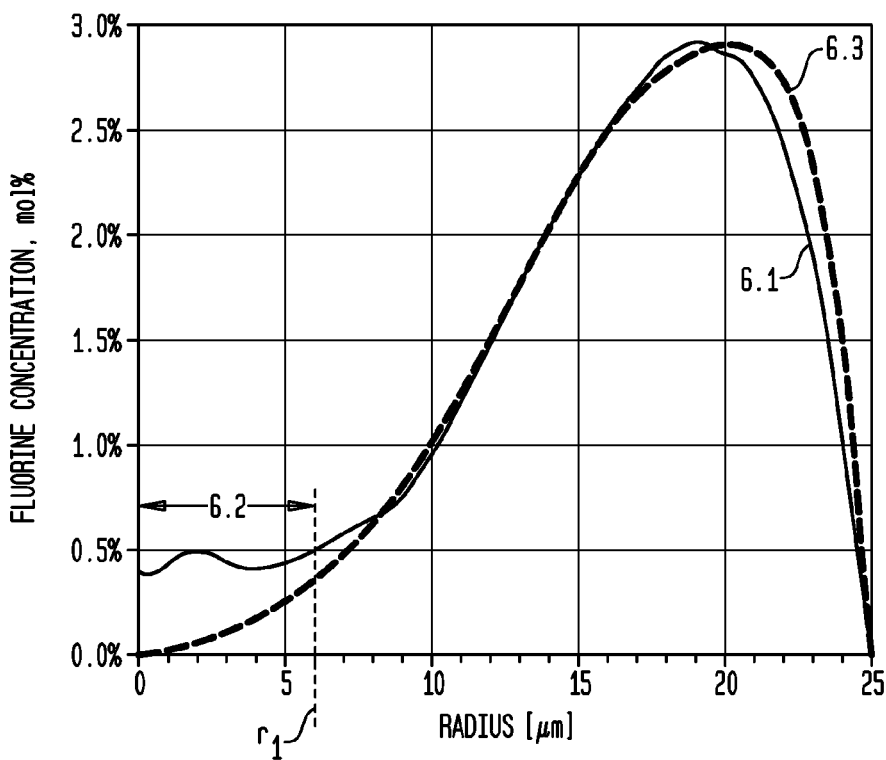
FIG. 6 shows two F-dopant concentration profiles. One profile (solid curve) undulates as it heads toward r=0 and exhibits a flat-zone at r=0-6 μm, in accordance with one more embodiment of the invention. The other profile (dotted) does not exhibit such a flat-zone.

In one more illustrative embodiment of the invention, the core region (radius $r=25$ μm) of a GI MMF includes F as one of its dopants, as shown in FIG. 6. In general the dopant concentration profiles of the core region are designed following the principles of equations (1) and (2). In addition, the F concentration profile, shown by curve 6.1, exhibits a single flat-zone 6.2 extending from $r=0$ to approximately $r=6$ μm. The flatness of the zone is illustrated by the relatively small changes in the F concentration, which varies from approximately 0.4 mole % at $r=0$, to approximately 0.5 mole % at $r=2$ μm, to 0.4 mole % at $r=4$ μm, and back to 0.5 mole % at $r=6$ μm. Thus, concentration within zone 6.2 can be described as being generally undulating and characterized by a F concentration of approximately 0.45 mole %±0.05 mole %.

For comparison, we include a F concentration profile 6.3, which has no flat-zones.

Example III

Figure 7:
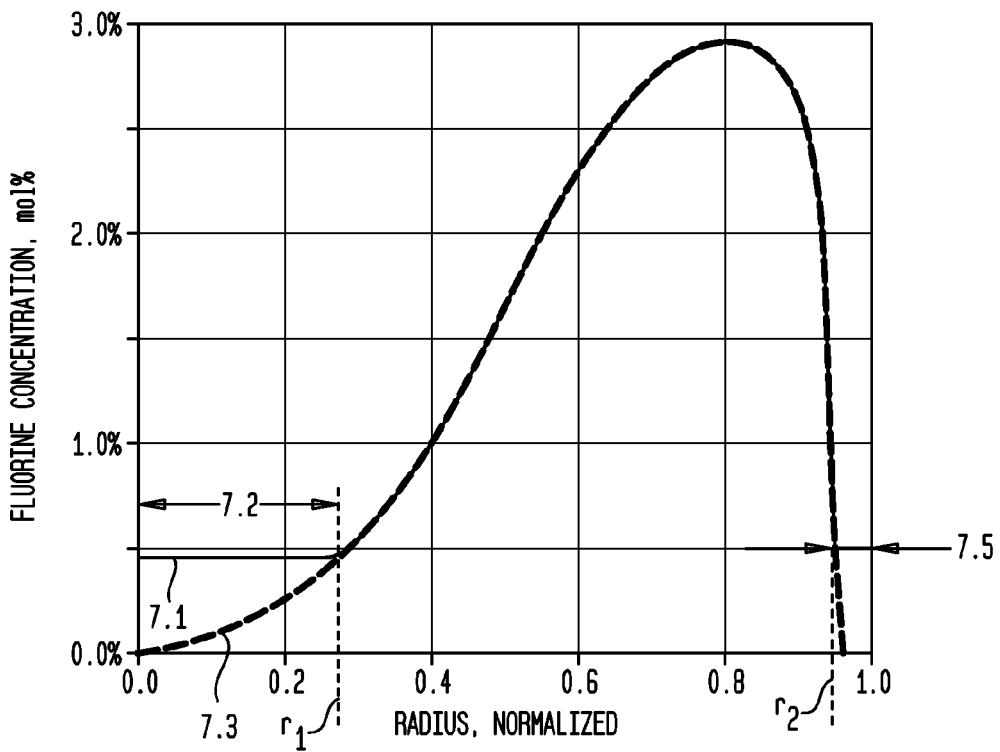
FIG. 7 shows a F-dopant concentration profile that includes two flat-zones, one near the fiber axis at r=0-0.33 (normalized with r=a=1.0); the other near the core region radius at r=0.95-1.0 (normalized with r=a=1.0)

In yet another illustrative embodiment of the invention, the core region (normalized radius $r=1.0$) of a GI MMF includes F as one of its dopants, as shown in FIG. 7. In general the dopant concentration profiles of the core region are designed following the principles of equations (1) and (2). In addition, the F concentration profile, shown by curve 7.1, exhibits two flat-zones. One flat zone 7.2 is located near the fiber axis and extends from r=0 to approximately $r_1$=0.33. The other zone 7.4 is located near the interface between the core and cladding regions and extends from $r_2$=0.95 to r=1.0. The flatness of zones 7.2 and 7.4 is self-evident since the F concentration is essentially unchanging within both zones.

For comparison, we include a F concentration profile 7.3, which has no flat-zones.

Example IV

Figure 2A:
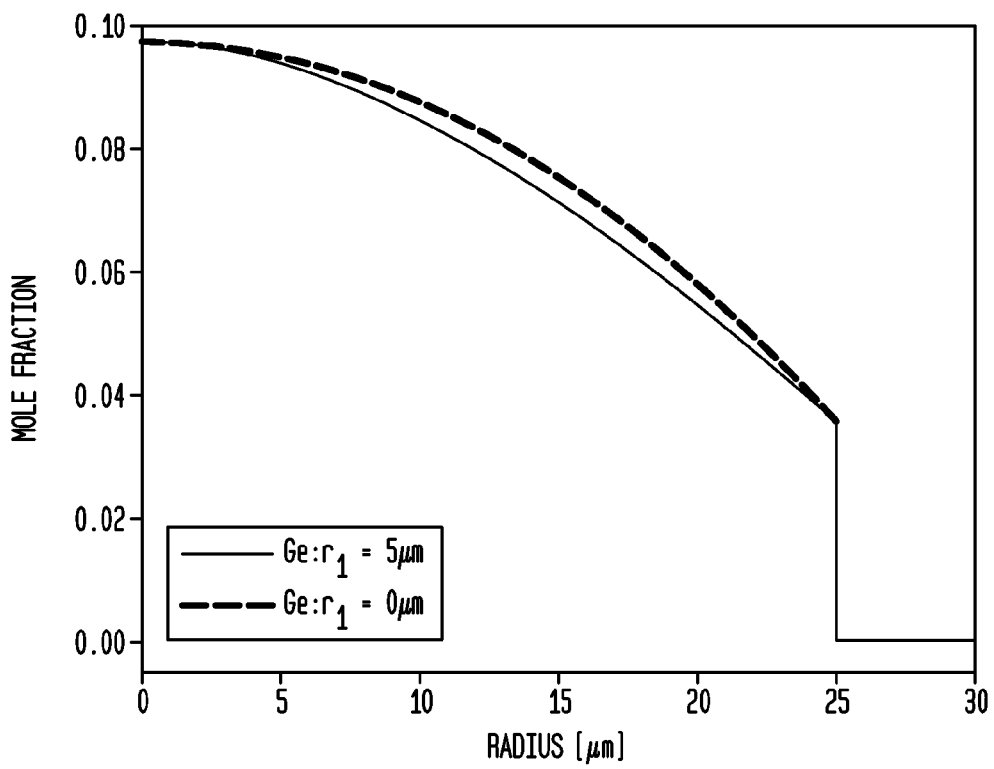
Figure 2B:
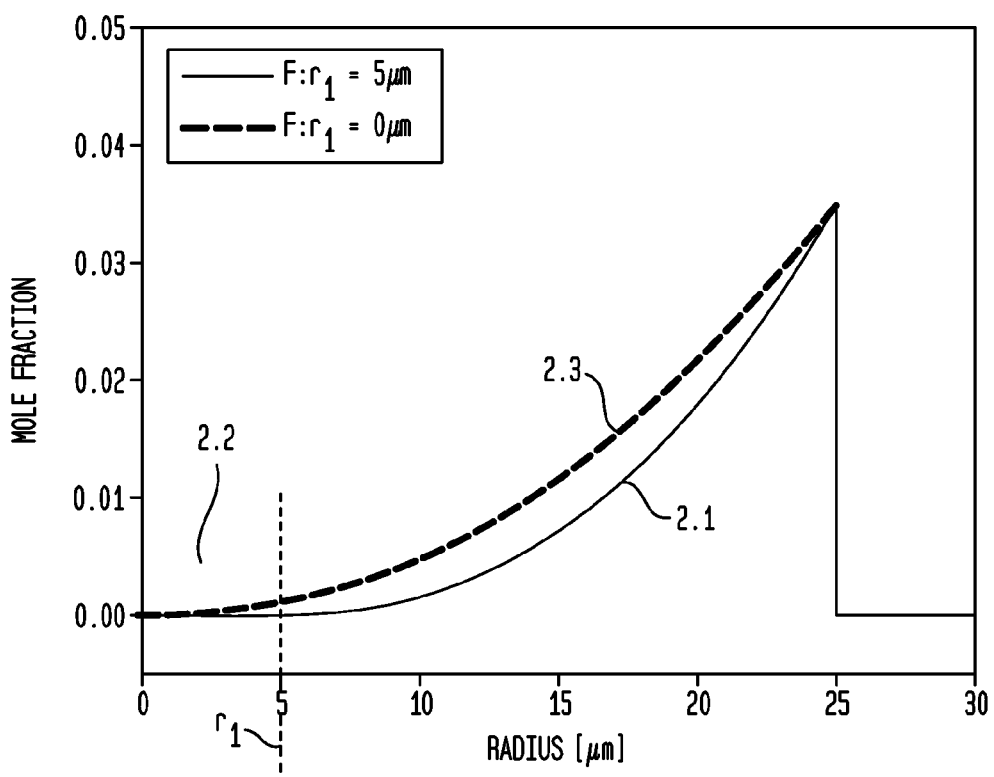
Figure 2C:
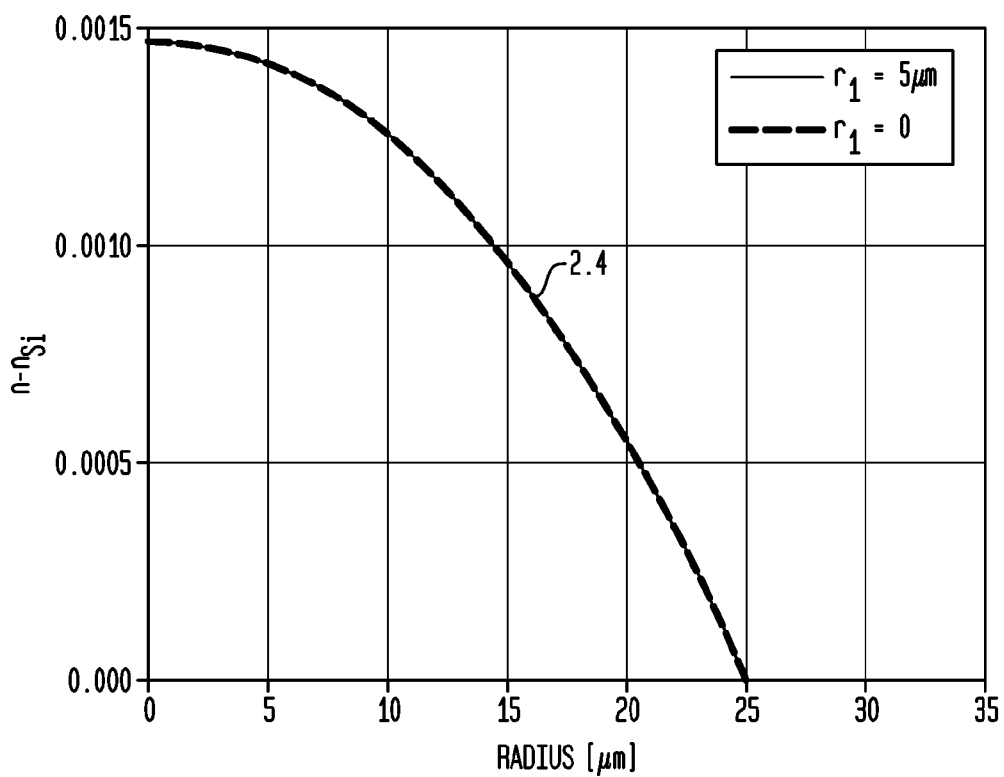
Figure 2D:
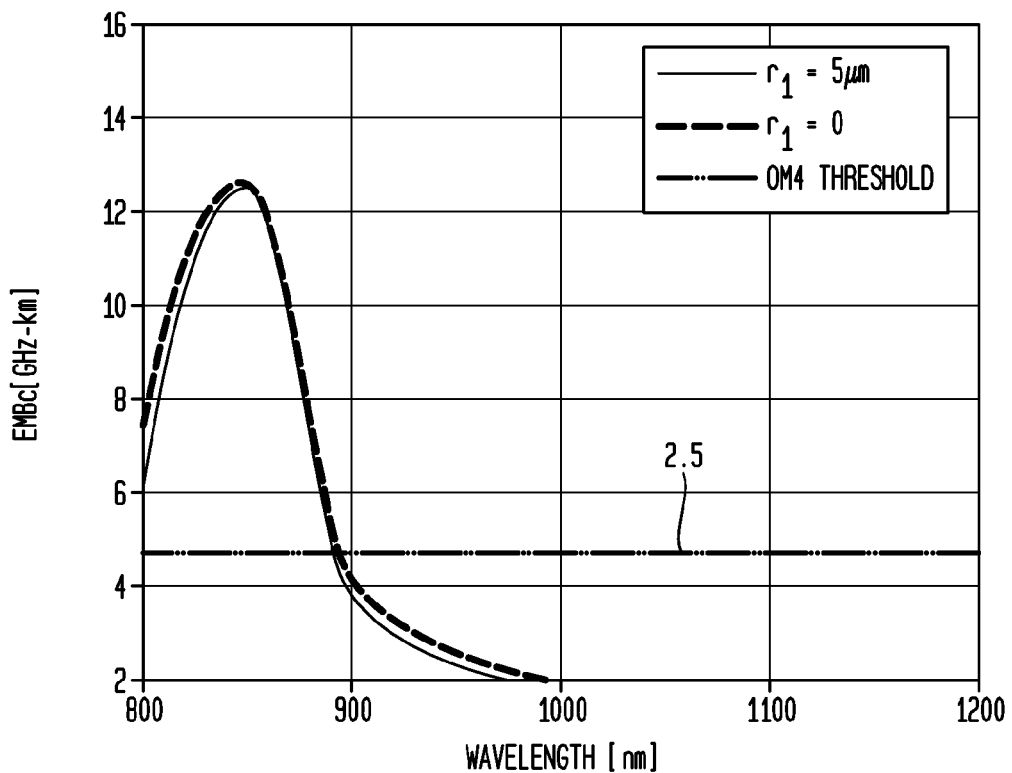

In another embodiment of the invention, we describe a GI MMF at 850 nm. FIGS. 2A-2C illustrate design aspects of the fiber, and FIGS. 2D and 2E illustrate performance aspects of the fiber. In general, the solid curves correspond to a GI MMF having a flat-zone in its F concentration profile, whereas the dotted curves correspond to a GI MMF that has no such flat zone. The latter are included solely to provide a reference.

The core region (radius r=25 μm) of the GI MMF includes $GeO_2$ and F as its dopants, as shown by their respective concentration profiles in FIGS. 2A and 2B. In general the dopant concentration profiles of the core region are designed following the principles of equations (1) and (2). In addition, the F concentration profile 2.1 exhibits a zero-level flat-zone 2.2 extending from r=0 to approximately $r_1$=5 μm; that is, the F concentration is zero over the entire flat-zone range.

In this example, we have placed an upper limit of 3.5 mole % on the F concentration.

The composite index profile resulting from doping a silica core region with F and $GeO_2$ concentration profiles of FIGS. 2A and 2B, respectively, is shown in FIG. 2C. The index profile 2.4 is essentially parabolic.

From a performance perspective, FIG. 2D shows the effective modal bandwidth (EMBc; computed) for the MMF designs of FIGS. 2A-2C. The threshold for OM4 compliance is shown by line 2.5 for reference. It is apparent that the fibers are OM4 compliant for 100 nm (from 800-900 nm). In addition, FIG. 2E shows the outer differential mode delay (DMD) for both designs of FIGS. 2A-2C. FIGS. 2D and 2E demonstrate that little penalty, if any, is paid by including the flat-zone 2.2 in this GI MMF design.

Example V

Figure 3A:
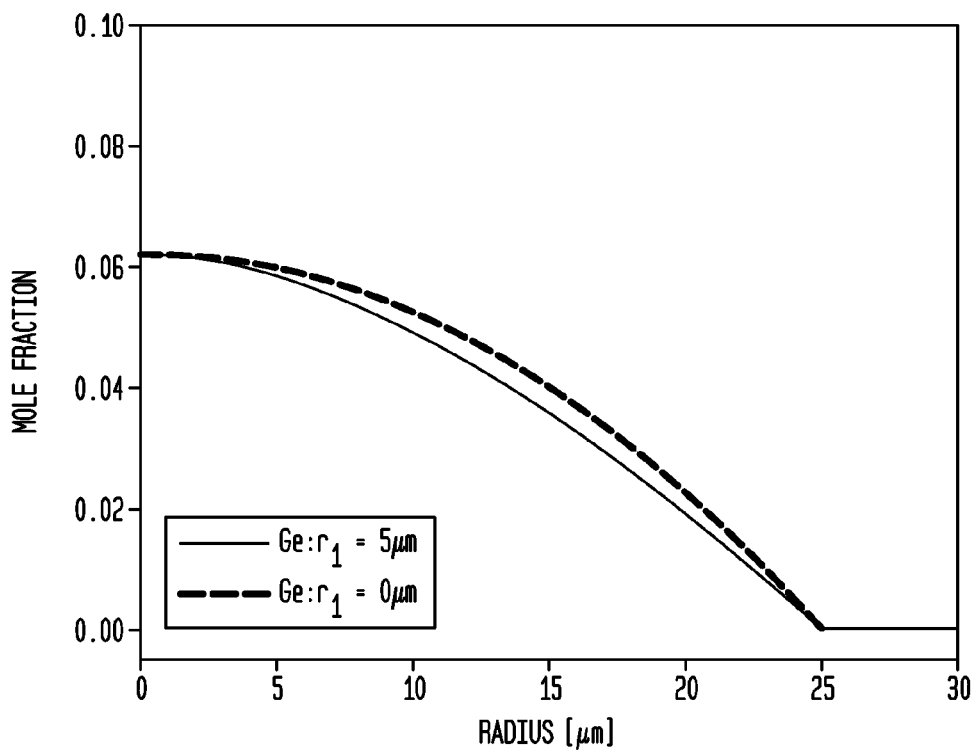
FIGS. 3A-D and FIG. 4 compare the design and performance of two down-doped MMF designs at 850 nm. In both designs the core region is doped with Ge and F. In one design (solid curves) the F concentration profile has a flat-zone at r=0-5 μm, in accordance with one embodiment of the invention. The other design (dotted curves) does not have such a flat-zone.
Figure 3B:
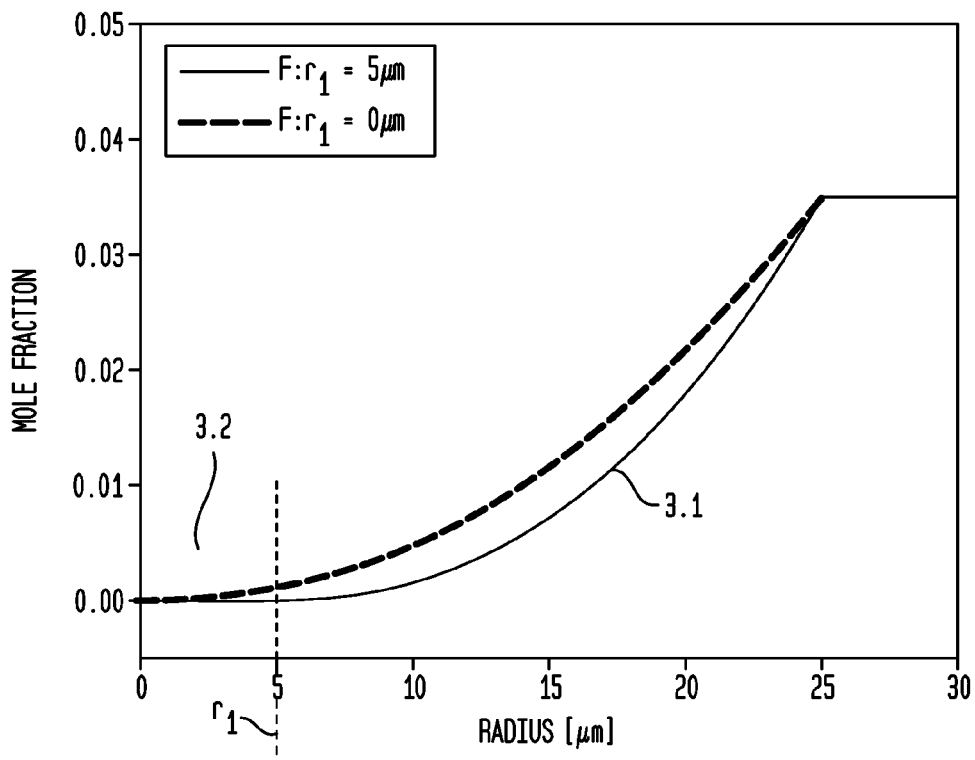
Figure 3C:
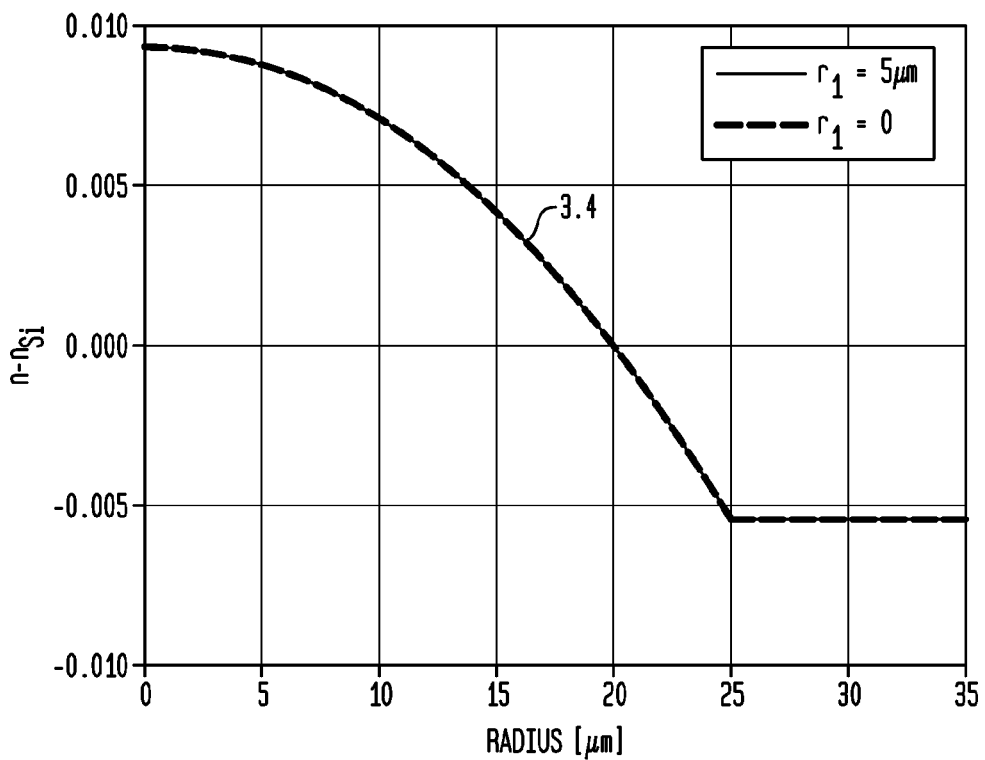
Figure 3D:
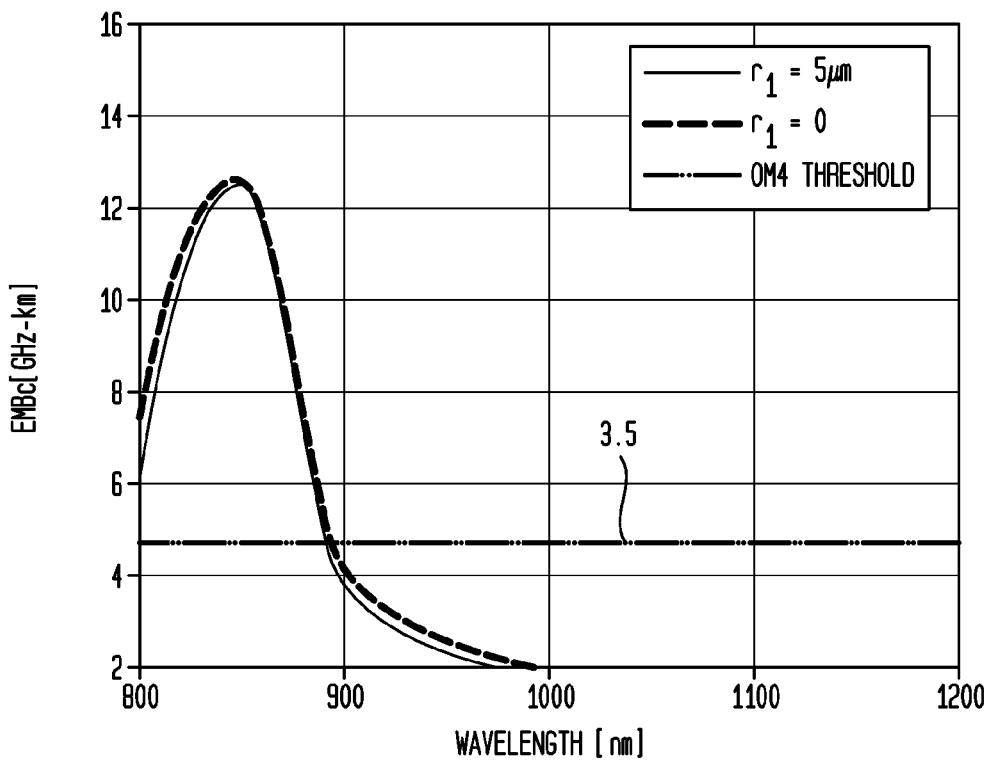
Figure 4:
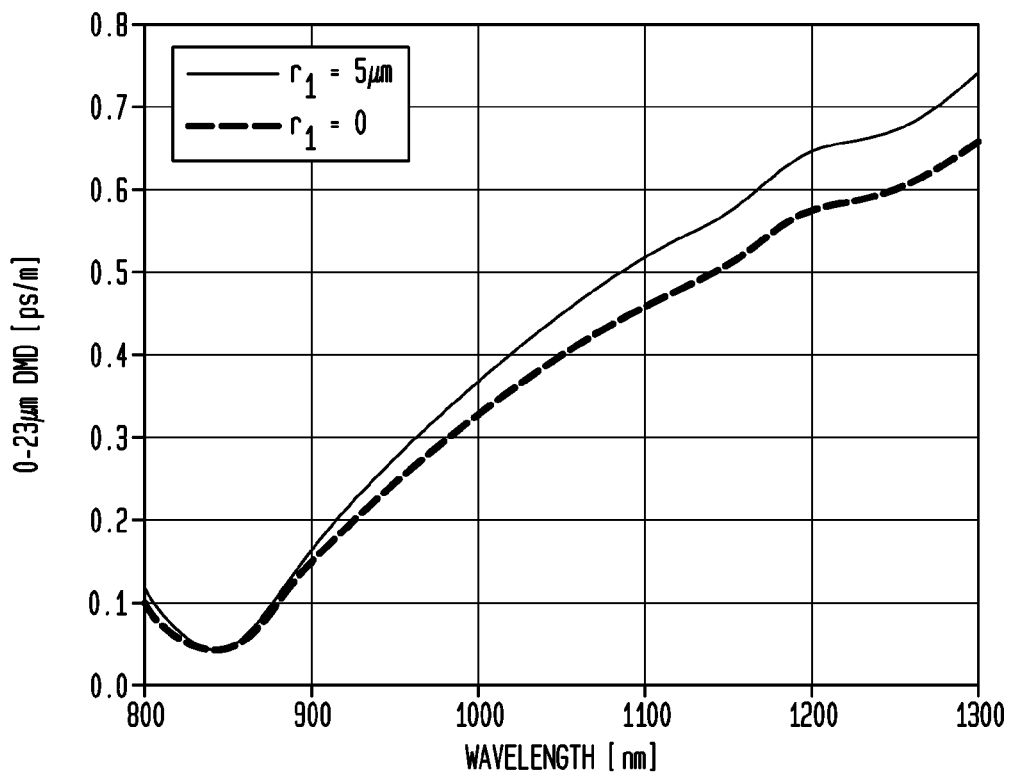

In another embodiment of the invention, we describe a down-doped GI MMF at 850 nm. FIGS. 3A-3C illustrate design aspects of the fiber, and FIGS. 3D and 3E illustrate performance aspects of the fiber. In general, the solid curves correspond to a down-doped GI MMF having a flat-zone in its F concentration profile, whereas the dotted curves correspond to a down-doped GI MMF that has no such flat zone. The latter are included solely to provide a reference.

The core region (radius r=25 μm) of the GI MMF includes $GeO_2$ and F as its dopants, as shown by their respective concentration profiles in FIGS. 3A and 3B. In general the dopant concentration profiles of the core region are designed following the principles of equations (1) and (2). In addition, the F concentration profile 3.1 exhibits a zero-level flat-zone 3.2 extending from r=0 to approximately $r_1$=5 μm; that is, the F concentration is zero over the entire flat-zone range.

In this example, we have placed an upper limit of 3.5 mole % on the F concentration.

The composite index profile resulting from doping a silica core region with F and $GeO_2$ concentration profiles of FIGS. 3A and 3B, respectively, is shown in FIG. 3C. The index profile 3.4 is essentially parabolic.

From a performance perspective, FIG. 3D shows the effective modal bandwidth (EMBc; computed) for the MMF designs of FIGS. 3A-3C. The threshold for OM4 compliance is shown by line 3.5 for reference. It is apparent that the fibers are OM4 compliant for about 90 nm (from 800-890 nm). In addition, FIG. 3E shows the outer differential mode delay (DMD) for both designs of FIGS. 3A-3C, FIGS. 3D and 3E demonstrate that little penalty, if any, is paid by including the flat-zone 3.2 in this GI MMF design.

Example VI

This example describes a broadband GI MMF for use in CWDM applications. The core region of the MMF is co-doped with Ge, P and F. The dopant concentration profiles are designed to reduce (preferably minimize) variations in z(r,λ) with respect to wavelength, as discussed previously.

The F concentration profile 8.1 follows the general pattern of FIG. 5; that is, profile generally decreases from about 3.0 mole % at r=a=25 μm to about 0.6 mole % at r=0. In addition, F profile 8.1 has a flat-zone 8.2 near the fiber axis in accordance with this example of our invention. Zone 8.2 extends from r=0 to approximately $r_1$=10 μm. Within zone 8.2 the F concentration either remains essentially flat or decreases from r=0 to ~3<$r_1$<~10 μm and then increases to ~2.5-3.5 mole % from $r_1$ to r=a.

On the other hand, the P ($P_2O_5$) concentration profile 8.3 decreases monotonically from ~2.5-3.5 mole % to ~0 mole % from r=0 to r=a.

Lastly, the Ge concentration profile 8.4 decreases monotonically with increasing radius, as depicted. In general, however, the shape of the Ge profile 8.4 depends on a variety of other factors well-know in the art; for example, the other dopants present in the core region, the NA, the core region diameter, and the location of the bandwidth peak.

Example VII

This example describes another broadband GI MMF for use in CWDM applications. Compared to Example VII, this MMF of this example is intended for broader wavelength applications.

The core region of the MMF is co-doped with Ge, P and F. The dopant concentration profiles are designed to reduce (preferably minimize) variations in z(r, λ) with respect to wavelength, as discussed previously.

The F concentration profile 9.1 follows the general pattern of FIG. 7; that is, profile 9.1 generally increases from about 0 mole % at r=a=25 μm to a peak of about 2.8 mole % at r=20 μm and then decreases to about 0.4 mole % at r=0. In addition, F profile 9.1 has a flat-zone 9.2 near the fiber axis in accordance with this example of our invention. Zone 9.2 extends from r=0 to approximately $r_1$=10 μm. Within zone 9.2 the F concentration either remains essentially flat or decreases from r=0 to −3<$r_1$<~10 μm, then increases to ~2.5-4.0 mole % from $r_1$ to r~18-22 μm, and then decreases to a zero or decreases to a second flat zone (7.5, FIG. 7) from r~23 μm to r=a=25 μm.

On the other hand, the P ($P_2O_5$) concentration profile 9.3 decreases monotonically from ~1.0-3.5 mole % at r=0 to ~0.1 mole % at r~18-22 μm, then increases monotonically to ~0.4-

1.0 mole % at r~22-24 μm, and finally decreases monotonically to an approximate value between 0-1.0 mole % at r=a=25 μm.

Lastly, the Ge concentration profile 9.4 is somewhat flat a shorter radii and then decreases monotonically at larger radii, as depicted. In general, however, the shape of the Ge profile 8.4 depends on a variety of other factors well-know in the art; for example, the other dopants present in the core region, the NA, the core region diameter, and the location of the bandwidth peak.

Typically the fibers depicted in FIGS. 8 and 9 comprise silica and are designed for operation in a CWDM system. They are illustratively characterized by an NA~0.2 and have a parabolic index profile with α=2.08±0.1. As mentioned above, they commonly have a radius r=a=25 μm approximately.

Manufacturing/Fabrication Process

Various design and performance characteristics are typically known a priori, and these are provided as inputs to a computer (or computer system). Illustrative performance characteristic inputs include either (or both) effective mode bandwidth (EMBc) and differential modal delay (DMD). Design inputs include the numerical aperture (NA) and the bandwidth for the particular application of the MMF. Other design inputs include dopant data associated with doping various regions of the fiber; that is, the kind of dopant (e.g., Ge, P, Al, B and/or their oxides, as well as F), the relationship between the refractive index and the dopant, and the region to be doped (e.g., the core, trench, inner cladding and/or outer cladding regions). Finally, any structural features (e.g., a cladding feature such as a trench) are also inputted to the computer, which processes all these inputs in accordance with the principles described above.

The output of the computer computation is a set of dopant concentration profiles (one profile for each dopant inputted to the computer). These profiles serve as inputs to a controller, which in turn controls a deposition system (e.g., an MCVD system); that is, a multiplicity of glass layers are deposited on a suitable substrate, and each of these layers is doped (or not doped) in accordance with dopant profiles to produce a MMF preform. Illustratively, the glass layers are deposited by MCVD inside an undoped glass substrate tube. The as-deposited tube is then collapsed to form a solid core rod. Then, the core rod is further overclad by placing the core rod inside another overclad tube. Heat and vacuum are used to fuse the core rod and the overclad tube together to form a larger preform. Illustratively, both the substrate tube and the overclad tube have the same index.

Alternatively, the overclad process can also be performed simultaneously with the fiber drawing process. In the overclad-during-draw (ODD) process, the core rod is placed inside an overclad tube, and both are fused together as they are drawn into a fiber.

In the case of ODD of bend-insensitive fiber, the core rod is placed inside an F-doped inner tube and another undoped silica outer jacket tube. After fiber draw, the Ge—P—F core is located inside the undoped silica [substrate] cladding, which is surrounded by the F-doped inner cladding and then the undoped outer cladding. The F-doped inner tube has a lower refractive index than both the substrate and the outer jacket tubes.

In any case, the preform may be an intermediate product in and of itself, or it may serve as the "input" to a draw tower, which in standard fashion draws the preform into a MMF.

Design Procedure

The design process programmed into the computer follows, in general, the step-by-step procedure described below.

A broadband GI MMF is fabricated by the following sequence of process steps; (1) forming a core region having a transverse cross-section and a longitudinal axis, the core region being configured for broadband operation at wavelengths λ within a predetermined wavelength range, Λ; (2) forming a cladding region surrounding the core region; (3) forming the core and cladding regions so that they are configured to support the propagation of optical radiation in the core region and along the axis simultaneously in a plurality of transverse modes; the core region having a refractive index profile n(r, λ); (4) doping the core region with a plurality of dopants each having a concentration profile, the concentrations and distributions of the dopants being radially varied within the transverse cross-section of the core region so that the refractive index of the core region is radially graded and so that variations in z(r, λ) with respect to wavelength are reduced (preferably minimized), where z(r, λ) is defined by equation (1); (5) doping step (4) is performed so that the concentrations and distribution of the dopants are radially varied within the transverse cross-section of the core region and so that equation (2) is satisfied; and (6) forming the concentration profile of at least one of the dopants so that it has at least one flat-zone where the concentration of said at least one dopant is essentially constant with radius within the at least one zone.

The dopant concentration profiles are inputted to a deposition system that produces an optical fiber preform in which the concentration of each dopant in its core region corresponds to the inputted profiles. Using standard techniques, a fiber is drawn from the preform.

It is to be understood that the above-described arrangements are merely illustrative of the many possible specific embodiments that can be devised to represent application of the principles of the invention. Numerous and varied other arrangements can be devised in accordance with these principles by those skilled in the art without departing from the spirit and scope of the invention. In particular, the design framework of the present invention may also be applied to co-doped, few-moded optical fibers for potential use in WDM or DWDM (dense WDM) long-haul systems. In addition, although we have illustrated the flat-zone concept with specific examples of F concentration profiles having such zones, it will be apparent to those skilled in the art that the invention is equally applicable to other dopants, particularly those where MFCs have comparable low-flow-rate problems, especially P.

What is claimed is:

1. A broadband multimode optical fiber comprising:
  a core region having a transverse cross-section and a longitudinal axis, said core region being configured for broadband operation at wavelengths λ within a predetermined wavelength range, Λ, and
  a cladding region surrounding said core region,
  said core and cladding regions being configured to support the propagation of optical radiation in said core region and along said axis simultaneously in a plurality of transverse modes,
  said core region having a refractive index profile n(r, λ) and being co-doped with a plurality of dopants each having a concentration profile, the concentrations and distributions of said dopants being radially varied within said transverse cross-section of said core region so that the refractive index of said core region is radially graded and so that variations in z(r, λ) with respect to wavelength are reduced, where $$z(r,\lambda) \triangleq n^2(r,\lambda)k_0^2,$$

r is radius, $\lambda$ is the wavelength of said optical radiation, n is the refractive index of said core region, $k_0=2\pi/\lambda$ is the wave number, and wherein the concentration profile of at least one of said dopants has at least one flat-zone where the concentration of said at least one dopant is essentially constant with radius within said at least one zone.

2. The fiber of claim 1, wherein said core region has a radius r=a, and said at least one flat-zone extends from said axis over a radial distance from r=0 to $r=r_1 \ll a$.

3. The fiber of claim 1, wherein said core region has a radius r=a, and said at least one flat-zone extends from r a over a radial distance to $r=r_2$, where $r_2 < a$.

4. The fiber of claim 1, wherein the concentration of said at least one dopant is essentially constant with radius within said at least one zone in that the magnitude of said concentration does not vary by more than approximately ±0.1 mole % within said at least one zone when the concentration level of said at least one dopant is less than approximately 1.0 mole %.

5. The fiber of claim 1, wherein said fiber is manufactured by a silica glass deposition system in which mass flow controllers control the flow rate of dopant precursors, at least one of said controllers having difficulty controlling said flow rates accurately for a prescribed dopant precursor at low flow rates near or below a particular value, and wherein the concentration profile of the dopant deposited from said prescribed precursor includes said at least one flat zone.

6. The fiber of claim 5 wherein said deposited dopant is selected from the group consisting of fluorine and phosphorus.

7. The fiber of claim 1, wherein
said fiber comprises silica and is designed for operation in a CWDM system has an NA~0.2,
said core region is co-doped with Ge, P and F, has a parabolic index profile with $\alpha=2.08\pm0.1$, and has a radius $r=a=25$ μm approximately.

8. The fiber of claim 7, wherein said P and F dopants are characterized by concentration profiles as follows:
(a) said F concentration profile generally decreases from about 3.0 mole % at r=a=25 μm to about 0.6 mole % at r=0; and said F profile has a flat-zone that extends from r=0 to approximately r=10 μm; and within said F flat-zone said F concentration either remains essentially flat or decreases from r=0 to $\sim 3 < r_1 < \sim 10$ μm and then increases to ~2.5-3.5 mole % from $r_1$ to r=a; and
(b) said P concentration profile decreases monotonically from ~2.5-3.5 mole % to ~0 mole % from r=0 to r=a.

9. The fiber of claim 7, wherein said P and F dopants are characterized by concentration profiles as follows:
(a) said F concentration profile generally increases from about 0 mole % at r=a=25 μm to a peak of about 2.8 mole % at r=20 μm and then decreases to about 0.4 mole % at r=0; and said F profile has a flat-zone that extends from r=0 to approximately r=10 μm; and within said F flat-zone said F concentration either remains essentially flat or decreases from r=0 to $\sim 3 < r_1 < \sim 10$ μm, then increases to ~2.5-4.0 mole % from $r_1$ to r~18-22 μm, and then decreases to zero or decreases to a second flat zone from r~23 μm to r=a=25 μm; and
(b) said P concentration profile decreases monotonically from ~1.0-3.5 mole % at r=0 to ~0.1 mole % at r~18-22 μm, then increases monotonically to ~0.4-1.0 mole % at r=22-24 μm, and finally decreases monotonically to an approximate value between 0-1.0 mole % at r=a=25 μm.

10. A method of making a broadband multimode optical fiber comprising the steps of:
forming a core region having a transverse cross-section and a longitudinal axis, said core region being configured for broadband operation at wavelengths $\lambda$, within a predetermined wavelength range, $\Lambda$,
forming a cladding region surrounding said core region,
forming said core and cladding regions so that they are configured to support the propagation of optical radiation in said core region and along said axis simultaneously in a plurality of transverse modes,
said core region having a refractive index profile $n(r, \lambda)$,
doping said core region with a plurality of dopants each having a concentration profile, the concentrations and distributions of said dopants being radially varied within said transverse cross-section of said core region so that the refractive index of said core region is radially graded and so that variations in $z(r, \lambda)$ with respect to wavelength are reduced, where
$z(r,\lambda) \triangleq n^2(r,\lambda)k_0^2$, r is radius, $\lambda$ is the wavelength of said optical radiation, n is the refractive index of said core region, $k_0=2\pi/\lambda$ is the wave number, and forming the concentration profile of at least one of said dopants so that it has at least one flat-zone where the concentration of said at least one dopant is essentially constant with radius within said at least one zone; and
inputting the dopant concentration profiles to a deposition system that produces an optical fiber preform in which the concentration of each dopant in its core region corresponds to the inputted profiles.

11. The method of claim 10, wherein said core region is formed to have a radius r=a, and said at least one flat-zone is formed to extend from said axis over a radial distance from r=0 to $r=r_1 \ll a$.

12. The method of claim 10, wherein said core region is formed to have a radius r=a, and said at least one flat-zone extends from r=a over a radial distance to $r=r_2$, where $r_2 < a$.

13. The method of claim 10, wherein said doping step is performed so that the concentration of said at least one dopant is essentially constant with radius within said at least one zone in that the magnitude of said concentration does not vary by more than approximately ±0.1 mole % within said at least one zone when the concentration level of said at least one dopant is less than approximately 1.0 mole).

14. The method of claim 10, further including the step of manufacturing said fiber by by a silica glass deposition system in which mass flow controllers control the flow rate of dopant precursors, at least one of said controllers having difficulty controlling said flow rates accurately for a prescribed dopant precursor at low flow rates near or below a particular value, and wherein the said doping step is performed so that the concentration profile of the dopant deposited from said prescribed precursor includes said at least one flat zone.

15. The method of claim 10 wherein said deposited dopant is selected from the group consisting of fluorine and phosphorus.

16. The method of claim 10, further including the step of drawing an optical fiber from the preform.

\* \* \* \* \*